(12) United States Patent
Jachym et al.

(10) Patent No.: US 10,900,790 B2
(45) Date of Patent: Jan. 26, 2021

(54) INTERIOR BUILDING NAVIGATION SYSTEM

(71) Applicant: Autodesk, Inc., San Rafael, CA (US)

(72) Inventors: Ewa Jachym, Cracow (PL); Krzysztof Tarczynski, Cracow (PL); Ewelina Gajos, Cracow (PL); Tomasz Krzywda, Cracow (PL); Maksym Krawczyk, Bielsko-Biała (PL); Krzysztof Kestranek, Niepołomice (PL); Krzysztof Buchacz, Cracow (PL)

(73) Assignee: AUTODESK, INC., San Rafael, CA (US)

( * ) Notice: Subject to any disclaimer, the term of this patent is extended or adjusted under 35 U.S.C. 154(b) by 419 days.

(21) Appl. No.: 15/880,900

(22) Filed: Jan. 26, 2018

(65) Prior Publication Data
US 2019/0234742 A1    Aug. 1, 2019

(51) Int. Cl.
| | |
|---|---|
| G01C 21/20 | (2006.01) |
| G06F 21/31 | (2013.01) |
| G06T 17/05 | (2011.01) |
| G06F 21/44 | (2013.01) |

(52) U.S. Cl.
CPC .......... G01C 21/206 (2013.01); G06F 21/31 (2013.01); G06F 21/44 (2013.01); G06T 17/05 (2013.01); *G06F 2221/2111* (2013.01)

(58) Field of Classification Search
CPC ....... G01C 21/206; G06F 21/31; G06F 21/44; G06F 2221/2111; G06T 17/05
USPC .......................................................... 701/409
See application file for complete search history.

(56) References Cited

U.S. PATENT DOCUMENTS

| 2015/0036832 | A1* | 2/2015 | Usher | H04R 3/005 |
| | | | | 381/56 |
| 2015/0369612 | A1* | 12/2015 | Nishimura | G01C 21/3484 |
| | | | | 701/537 |
| 2017/0352257 | A1* | 12/2017 | Oliver | H04W 4/33 |
| 2018/0328737 | A1* | 11/2018 | Frey | G01C 21/3667 |

OTHER PUBLICATIONS

"Building information modeling", Wikipedia, https://en.wikipedia.org/wiki/Building_information_modeling, Last modified Feb. 25, 2017.
indoo.rs—Frequently Asked Questions, https://indoo.rs/faq/, Copyright 2017.

(Continued)

*Primary Examiner* — Gertrude Arthur Jeanglaude
(74) *Attorney, Agent, or Firm* — Gates & Cooper LLP (57) ABSTRACT

A method, apparatus, and system provides the ability to navigate within a building structure. A building information model (BIM) for a building structure is obtained, validated, and stored in a database in the cloud. A request for the validated BIM is received from a mobile device. The validated BIM is provided from the database to the mobile device. A destination within the building structure, is accepted from the mobile device via a navigation application on the mobile device. A route from a location of the mobile device to the destination is determined and provided to the mobile device. The navigation application utilizes the route and the validated BIM to direct the mobile application to the destination.

20 Claims, 6 Drawing Sheets

(56) References Cited

OTHER PUBLICATIONS indoo.rs SLAM Engine—automated radio mapping, https://slaminfo.indoo.rs/technology/slam-engine/, Copyright 2017.
indoo.rs SLAM, https://slaminfo.indoo.rs/, Copyright 2017.
Indoor Anayltics—Venue engagement analytics through Big Data, https://indoo.rs/solution/analytics/, Copyright 2017.
Indoor Navigation solution for the visually impaired community, https://indoo.rs/solution/visually-impaired/, Copyright 2017.
Indoor Positioning Features—indoo.rs, https://indoo.rs/features/, Copyright 2017.
Indoor Positioning System—data drives innovation, https://indoo.rs/solution/indoor-positioning-system/, Copyright 2017.
Pichler, S., "It is SLAM time—The SLAM Engine™ is here", Jan. 20, 2016, https:indoo.rs/the-slam-engine-is-here/, Copyright 2017.
"What is BIM?", What Is BIM I Building Information Modeling I Autodesk, http://www.autodesk.com/solutions/bim/overview#what-is-bim, Downloaded on Mar. 23, 2017.
Asset Tracking, https:indoo.rs/solution/asset-tracking/, Copyright 2017.

* cited by examiner

INTERIOR BUILDING NAVIGATION SYSTEM

BACKGROUND OF THE INVENTION

1. Field of the Invention

The present invention relates generally to navigation systems, and in particular, to a method, system, apparatus, and article of manufacture for location and navigation within a building, outside of the capabilities of global positioning systems (GPS).

2. Description of the Related Art

Current uses of GPS and maps allow people to navigate anywhere where the GPS signal is available, whether on bike, car or foot. When in a building, GPS becomes less useful. In this regard, while GPS may be able to get a signal to a user, neither the user nor the GPS signal (or map) has any information about a particular building. A user within a building presents a new set of challenges for navigation. In order to find a specific location, say a particular room, within a given building, a user either has to wander around until they find it or find and review the location on a floor plan, orient himself to the floor plan and then set off in the direction of the room. There exists a need for easy navigation within buildings.

The need for easy navigation may be of particular import for those with impaired vision, or blindness where navigating unfamiliar environments can be very challenging. Accordingly, there is a need to assist those that have vision issues with navigating the interior of buildings. In another exemplary use case, users in an unfamiliar setting of a building interior (e.g., an office building, a government facility, a hospital, etc.) may need to navigate to a particular location (e.g., a restroom, an office, a waiting area, etc.). Prior art systems fail to provide an efficient and easy solution for the above identified persons.

Prior art systems use sensors or other specialized devices that broadcast signals to the user to better orient them. Alternatively, prior art systems may require an administrator to manually navigate throughout a building while recording ground truths as part of a process to create a radio map of a building (e.g., see indoo.rs). Such processes are inefficient and fail to take advantage of already known building structures.

SUMMARY OF THE INVENTION

Embodiments of the invention overcome the problems of the prior art by utilizing information from building information model (BIM) systems to build a mobile application that guides people inside buildings. The mobile application communicates with a BIM model stored in the cloud where only dedicated BIM data (e.g., the data required for navigation) may be accessible. Detailed BIM information may be added to current functional plans of buildings and the application will download the required information (e.g., the plan of the building). Further, the data and navigation system may be available to a variety of different stakeholders such as citizens, emergency personnel (e.g., firefighters and police), building security, administration, etc.

In one or more embodiments of the invention, a BIM model for a building/building structure is defined. For newly designed buildings, the BIM model may be defined during the building design phase. For existing buildings that haven't been designed according to a BIM model, such a model may be created based on the building's plans. The user is equipped with a smartphone/smartwatch and mobile application. Inside the building, there may be several WiFi routers located in strategic locations (e.g., in case shopping centers, they may be placed in stores/shops). Upon entering a building, the mobile application (e.g., web or mobile application) detects a public WiFi network and may check to determine if the BIM model is available (e.g., on the cloud or within a local network) for the building. If available, the BIM model may be used by the application to build a map or as an indoor map for navigation (e.g., the application may access data from the cloud to acquire information about a given building). The application compares the current user's position within the building plan and is provided voice/visual guidance from the application about the desired destination in the building (e.g., via a route provided by a cloud service or as determined by the application itself).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability to easily navigate within buildings based on information within a building information model (BIM) system. BIM systems provide information extending well beyond the structure of a building including, but not limited to, floorplan information, locations of furniture, light locations and even current occupancy. The BIM information may also include voice activated information attached to particular locations within the building. For example, doors and windows may contain information that identifies them, either visually through a map, a sound or some kind of spoken text.

Consider that specific objects or parts of a room contain data structures that are activated, at particular times, given a user's start time from the entrance, based on a user's proximity to the object or through the user of some other sensor. Further, when a user comes in contact with an object, the data structure may be activated and inform the object as to the person's location, update that location on a map and the building BIM information and further inform the model of the person's location and whether a new update may be required.

One exemplary implementation of this solution would be a client-server solution where the user's phone app functions as a client that updates a building server with location information. The server would contain BIM information that can be converted and sent to the client/user to better inform the client/user about location, orientation, direction, etc. Once the server has the location of a user within a model and a user's desired location, instructions can be forwarded that guide the user to any location within the building. With this information, a user may more effectively be able to navigate through buildings without GPS.

System and Workflow Overview

Figure 1:
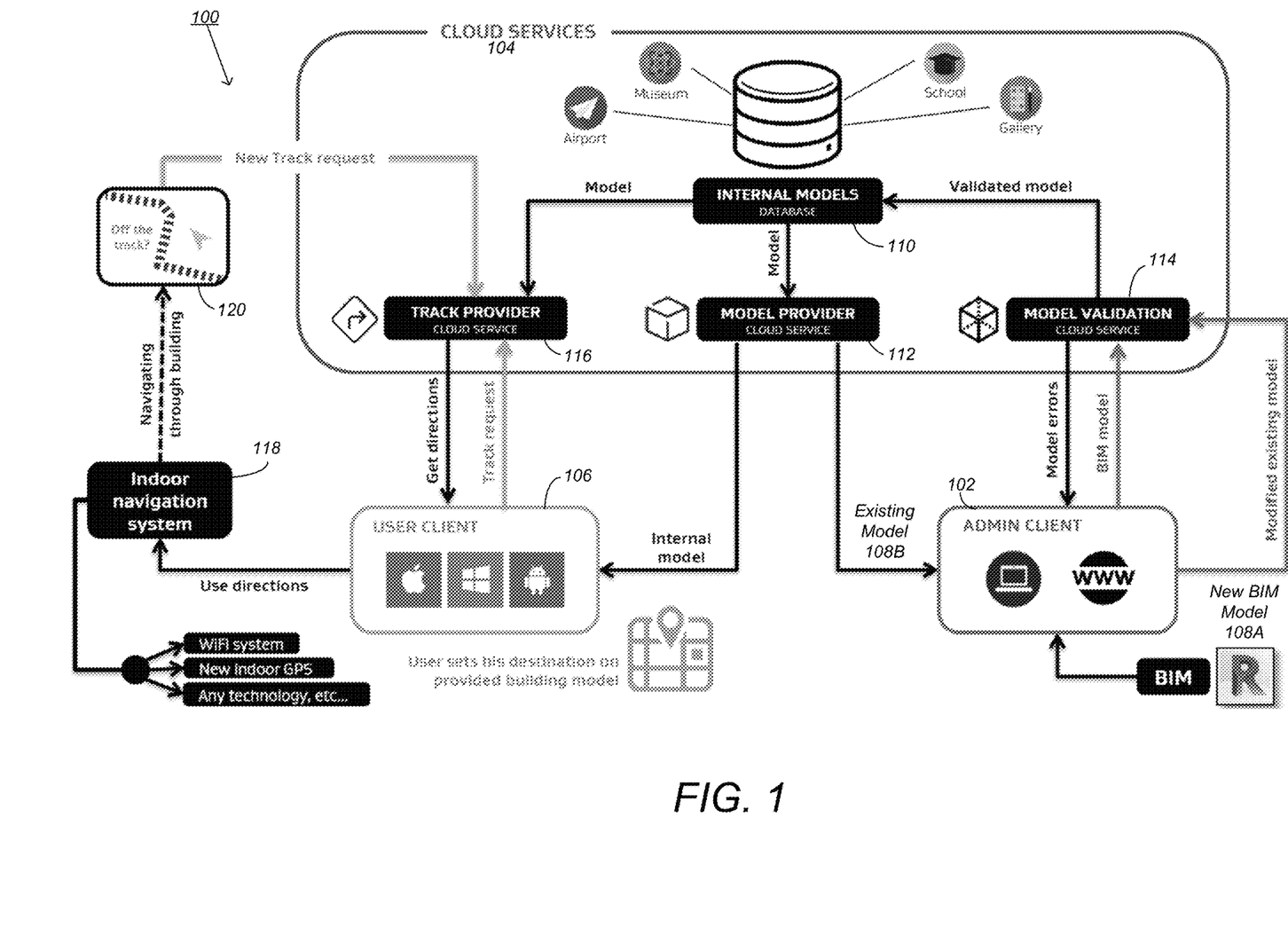
FIG. 1 illustrates an overview of the system and workflow in accordance with one or more embodiments of the invention.

FIG. 1 illustrates an overview of the system and workflow in accordance with one or more embodiments of the invention. The primary different components of the system 100 are the administrative client/owner 102, cloud services 104, and the user client 106.

Figure 2:
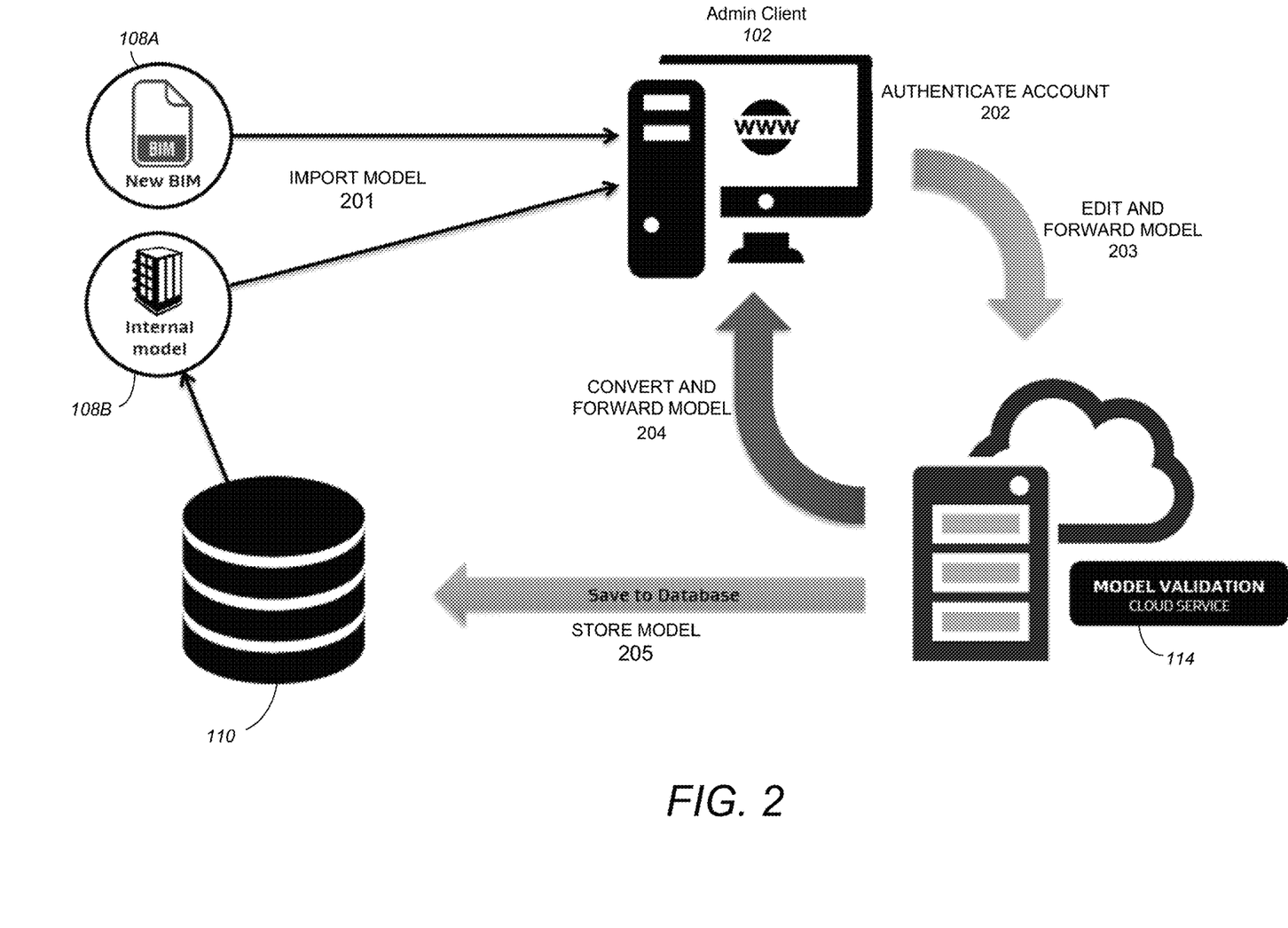
FIG. 2 illustrates the administrative workflow in accordance with one or more embodiments of the invention.

FIG. 2 illustrates the administrative workflow in accordance with one or more embodiments of the invention. Referring to both FIG. 1 and FIG. 2, at step 201, an administrative client/owner 102 (e.g., an administrator or owner of a building) creates a new BIM model 108A or imports an existing model 108B (e.g., from an internal model database 110 via a model provider 112 cloud service) (new BIM model 108A and existing model 108B are collectively referred to herein as BIM Models 108). BIM models (that may be stored in internal model database 110) may include representations of various different types of models such as airports, museums, schools, galleries, etc.

As illustrated in FIG. 1, various cloud services 104 provide different functionality within the overall system 100. At step 202, and admin/owner 102 account may be authenticated by a cloud service to determine access privileges (authentication cloud service is not shown in FIG. 1). In this regard, the account may be verified by the cloud to determine whether it is a casual user or a building administrator/owner 102.

At step 203, the admin or owner 102 edits or reviews the model 108 and when the model 108 is acceptable, the admin/owner 102 sends/transmits/provides the model 108 to the model validation cloud service 114.

At step 204, the BIM model 108 is converted to an internal model and sent back the admin/owner 102. The admin/owner 102 can now view any warnings and errors and also verify that the model 108 was converted correctly.

At step 205, after the model 1089 is converted by the model validation cloud service 114 and verified by the admin/owner (i.e., in step 204), the validation service 114 sends the model 108 to the internal models database 110 which stores projects in the cloud.

Figure 3:
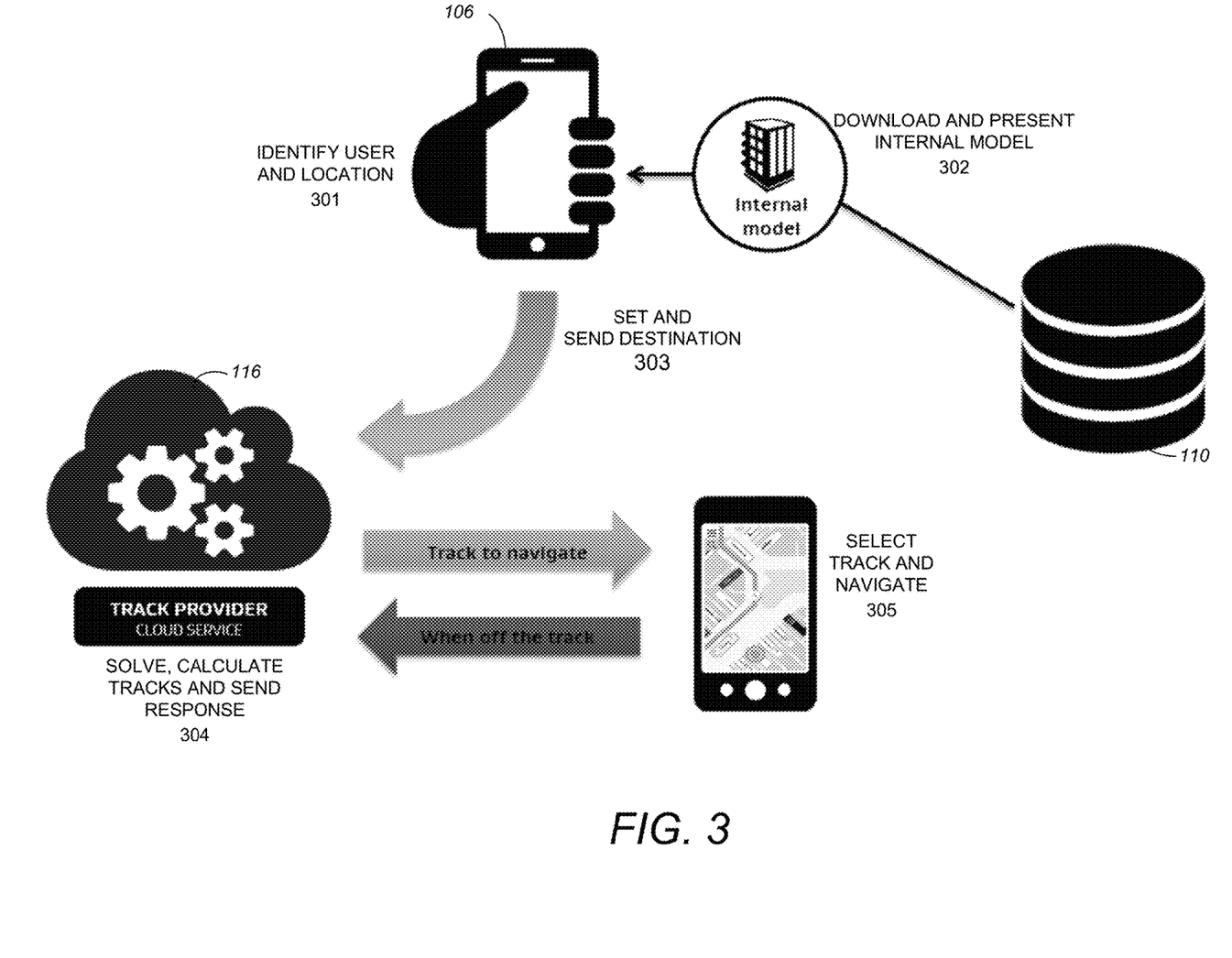
FIG. 3 illustrates the user workflow in accordance with one or more embodiments of the invention.

FIG. 3 illustrates the user workflow in accordance with one or more embodiments of the invention.

At step 301, a user 106 location is known thanks to GPS (global positioning system) or some other, technology (e.g., beacons, Wifi signal strength, etc.) available in mobile devices. When a user 106 enters a building (which has an internal model defined), a cloud service (e.g., authentication service) determines the user account type and preferences (e.g., voice or visual directions settings). In this regard, the authentication service may verify an account to determine whether the requesting user is an end/casual user 106 or a building administrator/owner 102.

At step 302, after the user account is successfully authenticated, the building internal model is automatically downloaded from the database 110 and presented on the user 106 device. Thereafter, the user 106 can explore the internal model and select a desired destination.

At step 303, the user sets a destination via whatever means desired (e.g., voice-client, mobile, web app, etc.) (e.g., the user sets the destination on the provided building model). The track request is sent to the track provider cloud service 116. The request contains the user's current location and desired destination point in the building.

At step 304, the track provider cloud service 116 solves the requested task and provides the directions back to the client 106. For example, machines in the cloud may calculate all possible tracks and send a response (e.g., the list of potential tracks/options) back to the client 106.

At step 305, the client 106 receives the response (from the track provider cloud service 116) and presents a few tracks. For example, the client 106 may display different route/track options or may provide the different track options to the user for selection (e.g., via voice selection, graphical user input selection, stylus, etc.). The user 106 can select one of the tracks and start a navigation using an indoor navigation system 118 (e.g., voice instructions). The indoor navigation system 118 may be performed through the building WiFi system, indoor GPS, beacons, or any other technology/navigation system. When the user turns off the track (e.g., the indoor navigation system 118 determines that the user 106 has strayed from the computed track at 120), another request may be sent to the track provider cloud service 116 which recalculates the track and provides the updated track to the user 106.

Exemplary Use Case

The system and method described herein can be used in a variety of different use cases. The application is not intended to be limited to any specific use case described herein.

One exemplary use case is for someone who is visually impaired. For example, suppose a visually impaired person arrives at an office building hoping to locate an office on the $5^{th}$ floor. The building contains all relevant BIM information, including floorplan as well as audio cues attached to certain objects and locations with the building. The user has a mobile device enabled with a navigation application/system in accordance with embodiments of the invention.

The user enters building and uses their phone at an entrance scanner. For example, the user may scan a QR code, activate the application via an RF transmission, a beacon device or other WiFi/Bluetooth technology activates the application, etc.

Upon activation, the building establishes a secure connection with the user. Using Bluetooth, a unique ID is created. The user may also share data from a wearable fitness device that may provide a better indication of the best route for the user (e.g., stairs, elevator, etc.). Such a wearable fitness device may also help with a time estimate for reaching the destination.

The user is prompted (e.g., via voice activation) for a location and instructed to use headphones and to hold their phone in a particular orientation. In one or more embodiments, the orientation is important because it allows the user to be properly guided within the confines of the building.

The user responds (e.g., selects) with a location/destination.

The user receives a floorplan of the building with a path, visual cues, etc. including voice guidance. At this point, the user may use the mobile in several ways, including as a strict map, as a heads-up display, or within cardboard goggles if not visually impaired.

Along the way proceeding along the track/route, as the user reaches destinations (or additional scanners), the directions, cues, etc. may be updated by the BIM model.

The user is instructed to proceed straight ahead 10 paces, followed by a left turn to the elevator bank. Once at the elevator, the user enters, and selects 5 (voice activated elevators). The user arrives at the 5$^{th}$ floor. The door opening event could be sent to the BIM model, allowing it to further calibrate the pace and instructions sent to the user.

The user exits the elevator and is instructed to proceed forward 7 paces, right turn, 20 paces. At any point during the navigation, cameras may be used to detect the user's progress, differentiated/compared against/to the sent instructions and may be used to calibrate existing and future instructions.

If at any point along the way, the user needs to change direction, or picks a different destination, the request can be made via the user/client, forwarded to the server, and new instructions can be generated and returned to the user/client.

The example above provides a simple example. Embodiments of the invention may be realized when utilized by those who are blind or have vision issues which impair them enough that reading signs and other static visual cues within buildings is beyond cumbersome or not possible. In the scenario above, this would mean that someone with impaired vision would require a mobile with headphones and cues about where to receive additional information from the BIM model—likely with the use of sensors, or "check-ins" from the user. The difference in workflow would be the use of headphones for voice cues for directions, as well as for obstructions, etc.

In addition, the camera usually found in a mobile phone might be used to capture information about the user's current surroundings, synched to the BIM model which would then generate an updated set of instructions to the user. For example, a BIM model may put a user 100 ft down a hall. When the user is only 50 ft down the hall, the user can utilize the phone to scan his/her surroundings, scan information (e.g., image, point clouds) are synched to the BIM model, and the user may be provided with an update.

Extend to Voice and Other Cues to GPS Enabled Mobiles

This basic idea of attaching sound and other audio cues can be extended to environments that are capable of receiving GPS signals in much the same way. For example, someone with impaired vision may likely have the same navigation issues and attaching sounds and other audio cues to the in-building objects using the same actions detailed above would apply. The basic idea is that that a user's surroundings are collected, a 3D model is generated, the user is located within the model, objects in the scene (curb, train station, fire hydrant) are located for that person, and audio curbs alert them to these.

Further to the above, additional information that might be available to users within a building would include locations of stairs, bathrooms, emergency exits as well as where to go in the event of an unforeseen event like a fire.

Logical Flow

Figure 4:
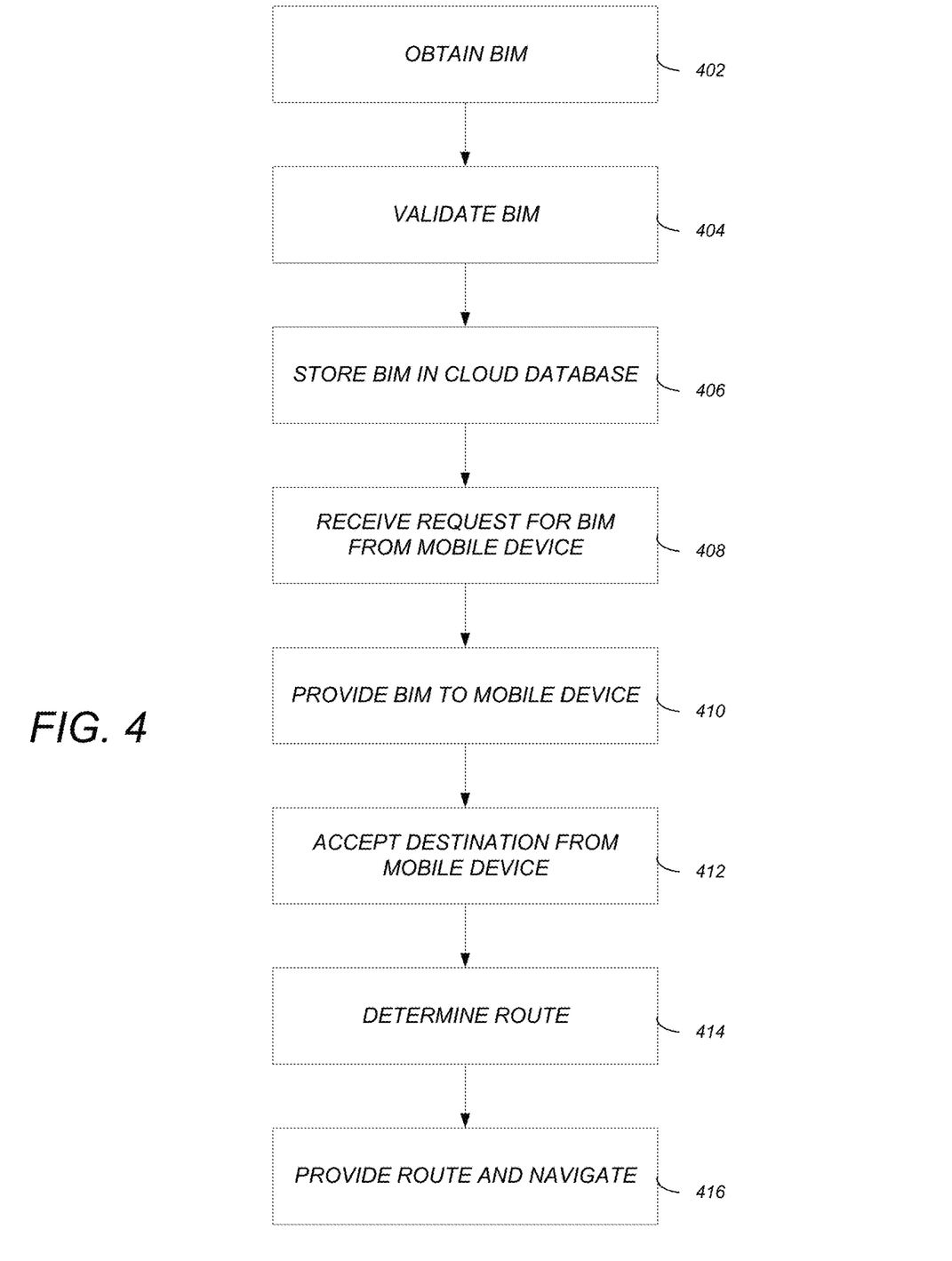
FIG. 4 illustrates the logical flow for navigating within a building structure in accordance with one or more embodiments of the invention.

FIG. 4 illustrates the logical flow for navigating within a building structure in accordance with one or more embodiments of the invention.

At step 402, a building information model (BIM) for a building structure is obtained (e.g., in the cloud/a cloud service).

At step 404, the BIM is validated. This step may also include an authenticating of an administrator to determine privileges for administering the BIM. The validating process may include receiving an internal model (that has been converted from the BIM) of the building structure. Such an internal model may then be verified as a valid representation of the BIM. Accordingly, the validated BIM may consist of the verified internal model.

At step 406, the validated BIM is stored in a database in the cloud.

At step 408, a request for the validated BIM is received from a mobile device.

At step 410, the validated BIM is provided form the database to the mobile device. Steps 408 and 410 may be performed upon a determination that the mobile device has entered the building structure (which has a validated BIM stored in the database). Further, the account type and user preferences for a user account of the mobile device may be determined (e.g., based on the determination of entering the building structure). In addition, the user account may be authenticated on the mobile device as a condition precedent to providing the validated BIM to the mobile device. In this regard, the providing of the BIM to the mobile device may be performed automatically (e.g., without additional user input) upon authentication of the user account.

At step 412, a destination within the building structure is accepted (from the mobile device). The destination is specified in a navigation application on the mobile device.

At step 414, a route from a location of the mobile device to the destination is determined.

At step 416, the route is provided to the mobile device. Further, the navigation application utilizes the route and the validated BIM to direct the mobile application to the destination. When providing the route, multiple routes may be presented on the mobile device and the navigation application accepts one of the routes based on user input. The navigation application may direct the mobile device to the destination using a WiFi system of the building structure. Further, the navigation application may track the mobile device, and determine when/whether the mobile device is off track. Once an off track determination has been made, the navigation application may transmit an updated destination (i.e., a request for a new route) to a track provider service in the cloud. The track provider cloud service determines an updated route and provides the updated route to the navigation application.

Hardware Environment

Figure 5:
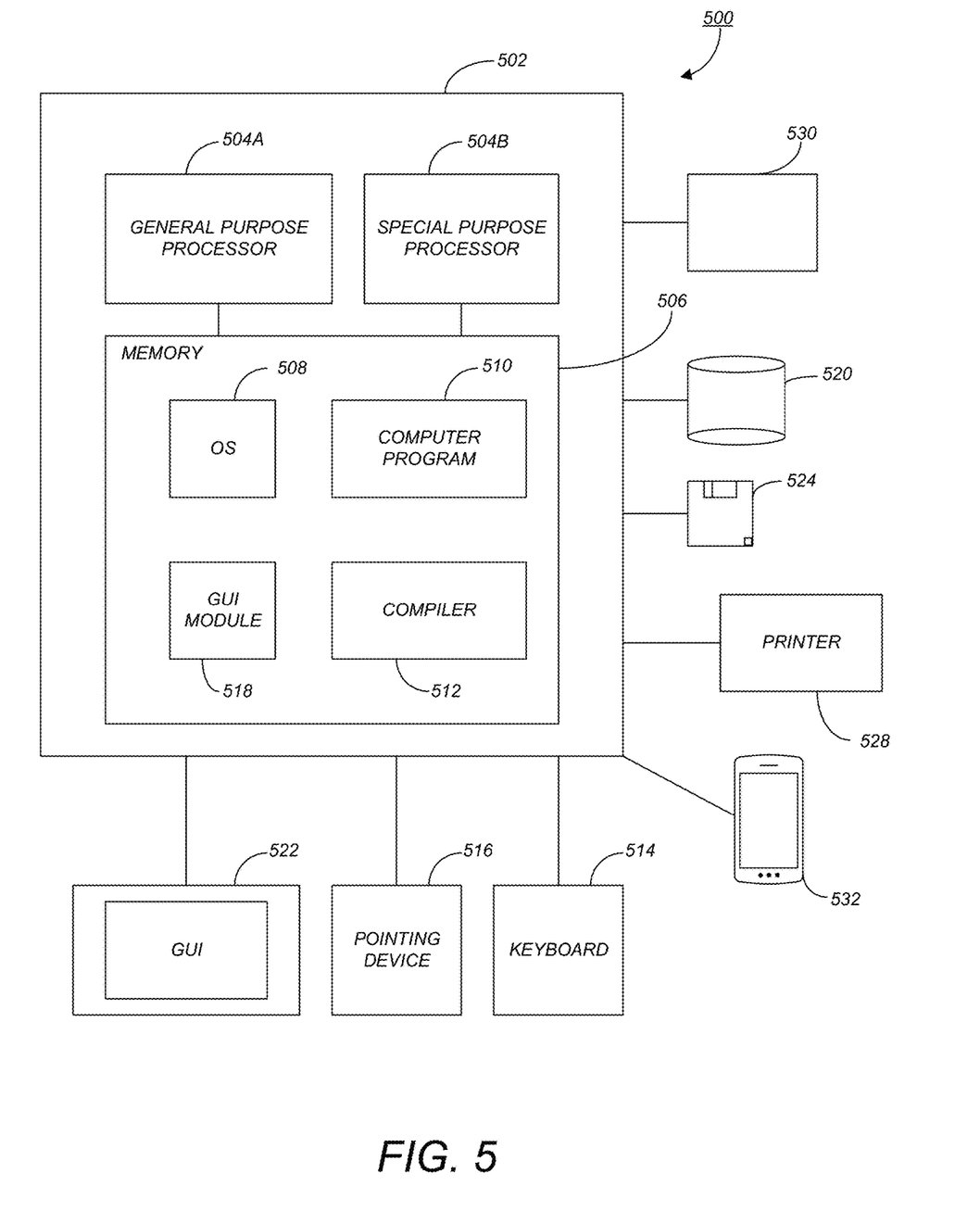
FIG. 5 is an exemplary hardware and software environment used to implement one or more embodiments of the invention.

FIG. 5 is an exemplary hardware and software environment 500 used to implement one or more embodiments of the invention. The hardware and software environment includes a computer 502 and may include peripherals. Computer 502 may be a user/client computer, server computer, or may be a database computer. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to, and/or integrated with, other devices, including input/output (I/O) devices such as a keyboard 514, a cursor control device 516 (e.g., a mouse, a pointing device, pen and tablet, touch screen, multi-touch device, etc.) and a printer 528. In one or more embodiments, computer 502 may be coupled to, or may comprise, a portable or media viewing/listening device 532 (e.g., an MP3 player, IPOD, NOOK, portable digital video player, cellular device, personal digital assistant, etc.). In yet another embodiment, the computer 502 may comprise a multi-touch device, mobile phone, gaming system, internet enabled television, television set top box, or other internet enabled device executing on various platforms and operating systems.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508, to provide output and results.

Output/results may be presented on the display 522 or provided to another device for presentation or further processing or action. In one embodiment, the display 522 comprises a liquid crystal display (LCD) having a plurality of separately addressable liquid crystals. Alternatively, the display 522 may comprise a light emitting diode (LED) display having clusters of red, green and blue diodes driven together to form full-color pixels. Each liquid crystal or pixel of the display 522 changes to an opaque or translucent state to form a part of the image on the display in response to the data or information generated by the processor 504 from the application of the instructions of the computer program 510 and/or operating system 508 to the input and commands. The image may be provided through a graphical user interface (GUI) module 518. Although the GUI module 518 is depicted as a separate module, the instructions performing the GUI functions can be resident or distributed in the operating system 508, the computer program 510, or implemented with special purpose memory and processors.

In one or more embodiments, the display 522 is integrated with/into the computer 502 and comprises a multi-touch device having a touch sensing surface (e.g., track pad or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 502 according to the computer program 510 instructions may be implemented in a special purpose processor 504B. In this embodiment, the some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program 510 instructions. In one embodiment, the special purpose processor 504B is an application specific integrated circuit (ASIC).

The computer 502 may also implement a compiler 512 that allows an application or computer program 510 written in a programming language such as C, C++, Assembly, SQL, PYTHON, PROLOG, MATLAB, RUBY, RAILS, HASKELL, or other language to be translated into processor 504 readable code. Alternatively, the compiler 512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 510 accesses and manipulates data accepted from I/O devices and stored in the memory 506 of the computer 502 using the relationships and logic that were generated using the compiler 512.

The computer 502 also optionally comprises an external communication device such as a modem, satellite link, Ethernet card, or other device for accepting input from, and providing output to, other computers 502.

In one embodiment, instructions implementing the operating system 508, the computer program 510, and the compiler 512 are tangibly embodied in a non-transitory computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of computer program 510 instructions which, when accessed, read and executed by the computer 502, cause the computer 502 to perform the steps necessary to implement and/or use the present invention or to load the program of instructions into a memory 506, thus creating a special purpose data structure causing the computer 502 to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 502.

Figure 6:
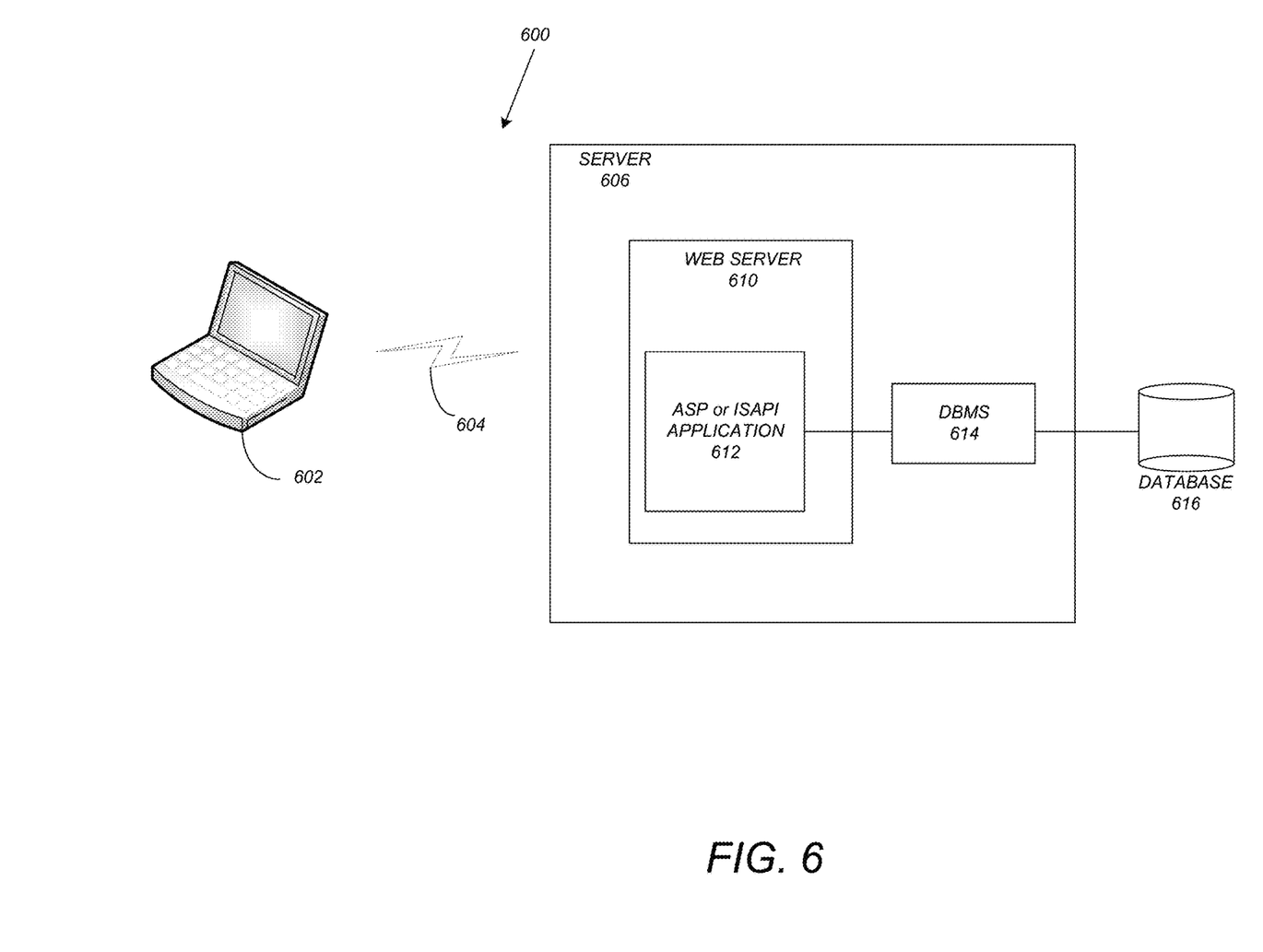
FIG. 6 schematically illustrates a typical distributed/cloud-based computer system using a network to connect client computers to server computers in accordance with one or more embodiments of the invention.

FIG. 6 schematically illustrates a typical distributed/cloud-based computer system 600 using a network 604 to connect client computers 602 to server computers 606. A typical combination of resources may include a network 604 comprising the Internet, LANs (local area networks), WANs (wide area networks), SNA (systems network architecture) networks, or the like, clients 602 that are personal computers or workstations (as set forth in FIG. 5), and servers 606 that are personal computers, workstations, minicomputers, or mainframes (as set forth in FIG. 5). However, it may be noted that different networks such as a cellular network (e.g., GSM [global system for mobile communications] or otherwise), a satellite based network, or any other type of network may be used to connect clients 602 and servers 606 in accordance with embodiments of the invention.

A network 604 such as the Internet connects clients 602 to server computers 606. Network 604 may utilize ethernet, coaxial cable, wireless communications, radio frequency (RF), etc. to connect and provide the communication between clients 602 and servers 606. Further, in a cloud-based computing system, resources (e.g., storage, processors, applications, memory, infrastructure, etc.) in clients 602 and server computers 606 may be shared by clients 602, server computers 606, and users across one or more networks. Resources may be shared by multiple users and can be dynamically reallocated per demand. In this regard, cloud computing may be referred to as a model for enabling access to a shared pool of configurable computing resources.

Clients 602 may execute a client application or web browser and communicate with server computers 606 executing web servers 610. Such a web browser is typically a program such as MICROSOFT INTERNET EXPLORER, MOZILLA FIREFOX, OPERA, APPLE SAFARI, GOOGLE CHROME, etc. Further, the software executing on clients 602 may be downloaded from server computer 606 to client computers 602 and installed as a plug-in or ACTIVEX control of a web browser. Accordingly, clients 602 may utilize ACTIVEX components/component object model (COM) or distributed COM (DCOM) components to provide a user interface on a display of client 602. The web server 610 is typically a program such as MICROSOFT'S INTERNET INFORMATION SERVER.

Web server 610 may host an Active Server Page (ASP) or Internet Server Application Programming Interface (ISAPI) application 612, which may be executing scripts. The scripts invoke objects that execute business logic (referred to as business objects). The business objects then manipulate data in database 616 through a database management system (DBMS) 614. Alternatively, database 616 may be part of, or connected directly to, client 602 instead of communicating/obtaining the information from database 616 across network 604. When a developer encapsulates the business functionality into objects, the system may be referred to as a component object model (COM) system. Accordingly, the scripts executing on web server 610 (and/or application 612) invoke COM objects that implement the business logic. Further, server 606 may utilize MICROSOFT'S TRANSACTION SERVER (MTS) to access required data stored in database 616 via an interface such as ADO (Active Data Objects), OLE DB (Object Linking and Embedding DataBase), or ODBC (Open DataBase Connectivity).

Generally, these components 600-616 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 602 and 606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 602 and 606. Embodiments of the invention are implemented as a software application on a client 602 or server computer 606. Further, as described above, the client 602 or server computer 606 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for navigating within a building structure, comprising:
   obtaining a building information model (BIM) for the building structure;
   validating the BIM;
   storing the validated BIM in a database in the cloud;
   receiving a request for the validated BIM from a navigation application on a mobile device, wherein the navigation application is activated upon entry of the mobile device into the building structure;
   providing the validated BIM from the database to the mobile device;
   accepting, from the mobile device, a destination within the building structure, wherein the destination is specified in the navigation application on the mobile device;
   determining a route from a location of the mobile device to the destination; and
   providing the route to the mobile device, wherein the navigation application:
      utilizes the route and the validated BIM to provide navigation of the mobile device to the destination; and
      directs the mobile device to be held in a particular orientation to allow the mobile device to be guided within confines of the building structure, wherein the particular orientation enables a camera of the mobile device to detect progress of the navigation and to calibrate navigation instructions.

2. The computer-implemented method of claim 1, further comprising:
   authenticating an administrator to determine privileges for administering the BIM.

3. The computer-implemented method of claim 1, wherein the validating the BIM comprises:
   receiving an internal model of the building structure, wherein the internal model was converted from the BIM;
   verifying that the internal model is a valid representation of the BIM; and
   wherein the validated BIM comprises the verified internal model.

4. The computer-implemented method of claim 1, further comprising:
   determining that the mobile device has entered the building structure that has a validated BIM stored in the database;
   based on the determining that the mobile device has entered the building structure, determining an account type and user preferences for a user account of the mobile device.

5. The computer-implemented method of claim 4, further comprising:

authenticating the user account on the mobile device as a condition precedent to providing the validated BIM from the database to the mobile device, and wherein the validated BIM is automatically, without additional user input, provided to the mobile device upon authentication of the user account.

6. The computer-implemented method of claim 1, wherein:
the providing the route comprises presenting the route amongst multiple routes;
the navigation application selects one of the routes based on user input.

7. The computer-implemented method of claim 1, wherein:
the navigation application directs the mobile device to the destination using a WiFi system of the building structure.

8. The computer-implemented method of claim 1, wherein the navigation application:
tracks the mobile device;
determines whether the mobile device is off track from the route;
upon determining that the mobile device is off track, transmits an updated destination to a track provider cloud service; and
receives an updated route from the track provider cloud service.

9. The computer-implemented method of claim 1, wherein the navigation application is activated upon entry of the mobile device into the building structure by scanning a QR code.

10. The computer-implemented method of claim 1, further comprising:
receiving data from a wearable fitness device; and
utilizing the data to provide a time estimate for reaching the destination.

11. A cloud based system for navigating within a building structure, comprising:
(a) a model validation cloud service executing on a computer, wherein the model validation cloud service:
(1) obtains a building information model (BIM) for the building structure;
(2) validates the BIM;
(3) stores the validated BIM in a database in the cloud;
(b) the database managed by a database management system in the cloud executing on the computer;
(c) a model provider cloud service executing on the computer, wherein the model provider cloud service:
(1) receives a request for the validated BIM from a navigation application on a mobile device, wherein the navigation application is activated upon entry of the mobile device into the building structure;
(2) provides the validated BIM from the database to the mobile device;
(d) a track provider cloud service executing on the computer, wherein the track provider cloud service:
(1) accepts, from the mobile device, a destination within the building structure, wherein the destination is specified in a navigation application on the mobile device;
(2) determines a route from a location of the mobile device to the destination; and
(3) provides the route to the mobile device, wherein the navigation application:
(i) utilizes the route and the validated BIM to provide navigation of the mobile device to the destination; and
(ii) directs the mobile device to be held in a particular orientation to allow the mobile device to be guided within confines of the building structure, wherein the particular orientation enables a camera of the mobile device to detect progress of the navigation and to calibrate navigation instructions.

12. The cloud based system of claim 11, wherein the model validation cloud service:
authenticates an administrator to determine privileges for administering the BIM.

13. The cloud based system of claim 11, wherein the model validation cloud service validates the BIM by:
receiving an internal model of the building structure, wherein the internal model was converted from the BIM;
verifying that the internal model is a valid representation of the BIM; and
wherein the validated BIM comprises the verified internal model.

14. The cloud based system of claim 11, wherein the track provider cloud service:
determines that the mobile device has entered the building structure that has a validated BIM stored in the database;
based on the determining that the mobile device has entered the building structure, determines an account type and user preferences for a user account of the mobile device.

15. The cloud based system of claim 14, wherein the model provider cloud service:
authenticates the user account on the mobile device as a condition precedent to providing the validated BIM from the database to the mobile device, and wherein the validated BIM is automatically, without additional user input, provided to the mobile device upon authentication of the user account.

16. The cloud based system of claim 11, wherein:
the providing the route comprises presenting the route amongst multiple routes;
the navigation application selects one of the routes based on user input.

17. The cloud based system of claim 11, wherein:
the navigation application directs the mobile device to the destination using a WiFi system of the building structure.

18. The cloud based system of claim 11, wherein the navigation application:
tracks the mobile device;
determines whether the mobile device is off track from the route;
upon determining that the mobile device is off track, transmits an updated destination to a track provider cloud service; and
receives an updated route from the track provider cloud service.

19. The cloud based system of claim 11, wherein the navigation application is activated upon entry of the mobile device into the building structure by scanning a QR code.

20. The cloud based system of claim 11, wherein the navigation application receives data from a wearable fitness device; and
utilizes the data to provide a time estimate for reaching the destination.

* * * * *